(12) United States Patent
Alper (10) Patent No.: US 6,337,016 B1
(45) Date of Patent: Jan. 8, 2002

(54) APPARATUS FOR REMOVING NOXIOUS CONTAMINANTS FROM DRAINAGE WATER

(75) Inventor: Haluk Alper, Flowery Branch, GA (US)

(73) Assignee: Mycelx Technologies Corporation, Gainesville, GA (US)

( * ) Notice: Subject to any disclaimer, the term of this patent is extended or adjusted under 35 U.S.C. 154(b) by 0 days.

(21) Appl. No.: 09/635,551

(22) Filed: Aug. 10, 2000

Related U.S. Application Data (63) Continuation-in-part of application No. 09/272,445, filed on Mar. 19, 1999.
(60) Provisional application No. 60/148,244, filed on Aug. 11, 1999.

(51) Int. Cl.$^7$ ............................................. B01D 15/00
(52) U.S. Cl. ...................... 210/265; 210/680; 210/693; 210/304; 210/305; 210/320; 210/502.1; 210/504; 210/506; 210/512.1; 210/532.1
(58) Field of Search .................................. 210/680, 690, 210/691, 692, 693, 500.25, 500.29, 502.1, 503, 504, 506, 532.1, 512.1, 304, 305, 320, 265

(56) References Cited

U.S. PATENT DOCUMENTS

| 5,437,793 A | 8/1995 | Alper | 210/728 |
|---|---|---|---|
| 5,698,139 A | 12/1997 | Alper | 252/314 |
| 5,759,415 A | * 6/1998 | Adams | 210/532.1 |
| 5,837,146 A | 11/1998 | Alper | 210/728 |
| 6,180,010 B1 | 1/2001 | Alper | 210/680 |

* cited by examiner

Primary Examiner—Robert Popovics
(74) Attorney, Agent, or Firm—Klauber & Jackson (57) ABSTRACT

The invention relates to an improvement in known apparatus for removing or separating certain contaminants and debris from drainage water. The known device has a tank defining a chamber with an inlet and a pair of vertically spaced outlets. A bulkhead with openings is spaced opposite the inlet and extends from the base of the chamber. A baffle is located between the bulkhead and the outlets and extends from the top of the chamber to near the bottom. An orifice plate or plates is adjustable mounted in series with the outlets and controls the rate of flow therethrough. The system thus has four sections, namely a non-floating particulate containment chamber; a floating particulate containment chamber; a flow control chamber; and an outlet chamber. In accordance with the invention, a fluid-previous media is provided at the interior of said apparatus in or abounding the flow path of the drain water proceeding between said inlet and outlet. The media is infused with a composition comprising a homogeneous thermal reaction product of an oil component selected from the group consisting of glycerides, fatty acids, alkenes, and alkynes, with a methacrylate or acrylate polymer component; the said contaminants in the drain water flowing through said apparatus thereby coming into intimate contact with and being immobilized at said media.

10 Claims, 3 Drawing Sheets

APPARATUS FOR REMOVING NOXIOUS CONTAMINANTS FROM DRAINAGE WATER

RELATED APPLICATIONS

This application claims priority from provisional patent application Ser. No. 60/148,244 filed Aug. 11, 1999. In addition this application is a continuation-in-part of Ser. No. 09/272,445 filed Mar. 19, 1999.

FIELD OF INVENTION

This invention relates generally to apparatus for removing noxious contaminants from aqueous systems, and more specifically relates to filtration devices and methods for removing both oily and slightly soluble organic compounds from such aqueous systems. The invention is particularly applicable to the removal of such contaminants from drainage water, such as collected rainwater.

BACKGROUND OF INVENTION

Increasing public awareness and concern regarding the effects on human and animal life of contamination of water sources, has led in recent years to the focusing of attention on contamination of drainage water. Simple rainstorms can generate torrents of water on city streets, and at paved and unpaved parking and other facilities, which water as it sweeps over these surfaces and into drains and catch basins, carries with it large quantities of oils, pernicious chemicals and the like, not to mention various solid and semisolid debris. A graphic picture of such events can be visualized by considering the resulting drainage when a rainstorm sweeps water across and through a large truck stop. The parking surfaces at such a facility are commonly stained with a variety of oily hydrocarbons, antifreeze, hydraulic fluids and the like. The resulting drainage of the rainwater carries these pernicious materials to groundwater tables, or to rivers, lakes and the like, all of which are often the source of public drinking waters. Aside from the addition of water insolubles such as oils and greases, this leads to the water sources being contaminated with pernicious slightly soluble organic compounds such as benzene, toluene, xylene, halogenated hydrocarbons, ethoxylated glycols, etc. These noxious contaminants are among the more difficult compounds to remove from water, and indeed most are carcinogenic.

Various devices and apparatus have been long known and used for removing or separating certain contaminants and debris from drainage water. An excellent example of a modern such device to which the present invention is applicable is disclosed in U.S. Pat. No. 5,759,415, the entire disclosure of which is hereby incorporated by reference. The said device has a tank defining a chamber with an inlet and a pair of vertically spaced outlets. A bulkhead with openings is spaced opposite the inlet and extends from the base of the chamber. A baffle is located between the bulkhead and the outlets and extends from the top of the chamber to near the bottom. An orifice plate or plates is adjustable mounted in series with the outlets and controls the rate of flow therethrough. The system is seen as having four sections, namely a non-floating particulate containment chamber; a floating particulate containment chamber; a flow control chamber; and an outlet chamber.

Figure 1:
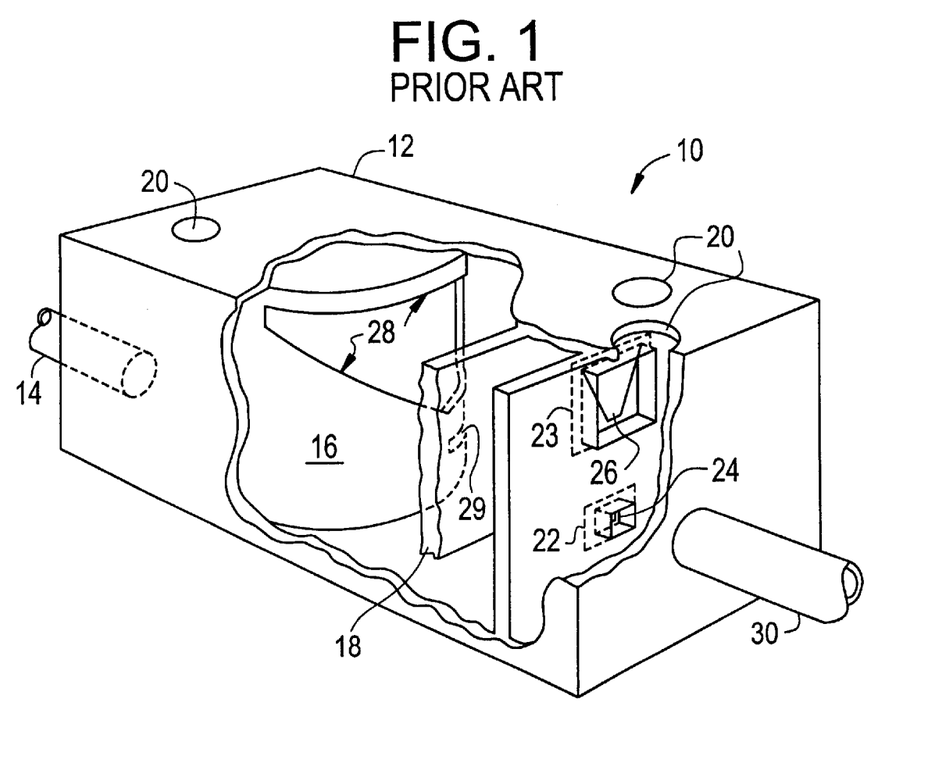
FIG. 1 is a perspective view of the prior art containment device partially broken away to reveal the bulkhead, openings, baffle and control outlet(s)
Figure 2:
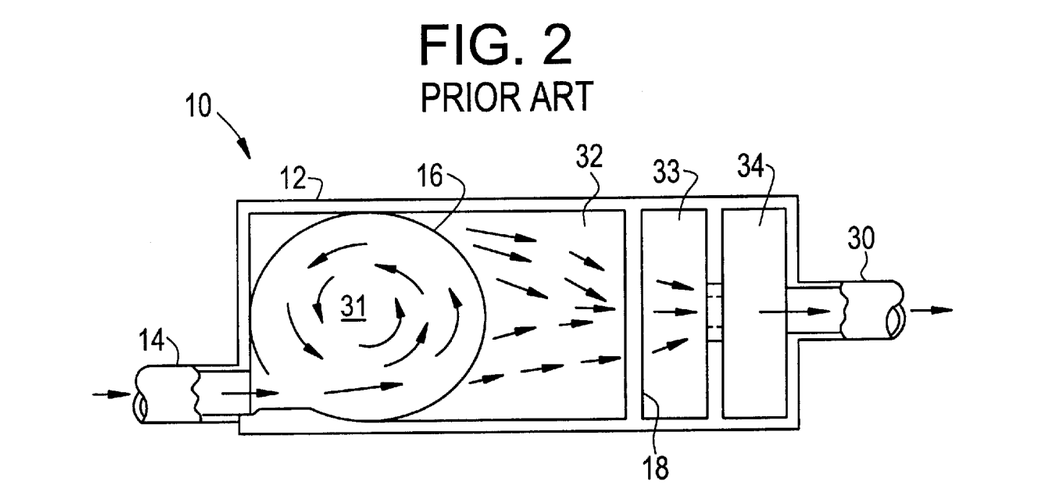
FIG. 2 is a horizontal section through the device looking from top to bottom.

This prior art device is illustrated in FIGS. 1 through 3F, and includes a tank 12, an inlet pipe 14, a bulkhead 16, baffle 18, removable cover 20, orifice plate 22, and weir plate 23, low-level outlet 24, and high-level outlet 26, openings 28 and 29 in bulkhead 16, and outlet pipe 30. As seen in FIG. 2, the bulkhead 16 and the wall of the tank 12 make a generally ovate or circular non-floating particulate containment chamber 31 and the inlet pipe is axially offset from the center of this chamber. The water enters through inlet pipe 14 and, due to the offset of the pipe and chamber shape, a swirling motion is imparted to the flow. The non-floatable particulate entrapped therein is contained by bulkhead 16. The bulkhead openings 28 and 29 allow passage of water. The bulkhead is constructed such that the floatable particulate flows through the bulkhead. Much of the floatable particulate is then contained by the baffle 18. The orifice plate 22, through which the low level water exits, controls the low level water flow. The weir plate 23, through which the high level water exits controls the high level water flow. The arrows in FIG. 2 show the drainage path taken by the rainwater through the subject invention. FIGS. 3A to 3F show the device during different stages of operation. The phantom line in FIG. 3A indicates the water level 50 before or after a drainage event when there is little or no drainage flow. The phantom line in FIG. 3B indicates the water level 50 during the initial phase of operation with non-floatable particulate being retained by bulkhead 16 and floatable particulate by baffle 18. The phantom line in FIG. 3C indicates the water level 50 during the transitional phase of operation as the volume of flow increases. The phantom line in FIG. 3D indicates the water level 50 during full capacity phase operation. The phantom line in FIG. 3E indicates the water level 50 which decreases during the phase in which water ceases to enter the invention 10. The phantom line in FIG. 3F indicates the water level 50 after all drainage has ceased, and the non-floating particulate containment chamber 31 has been cleaned.

Figure 3A:
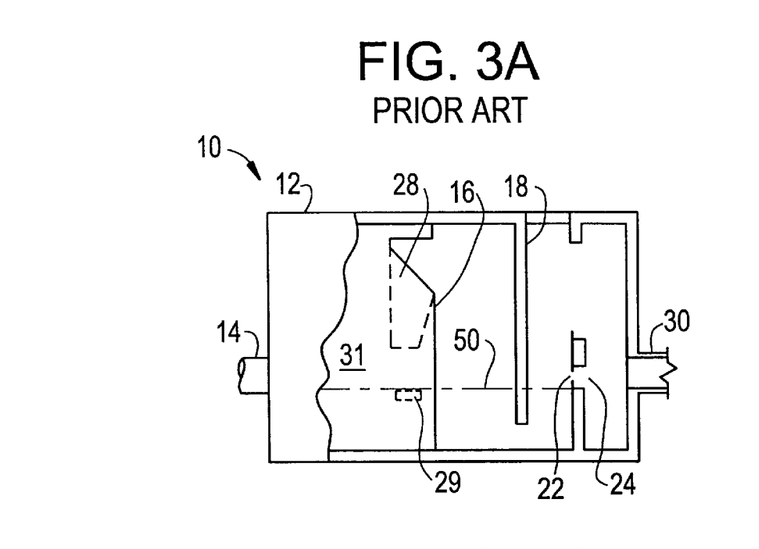
FIG. 3A is a side elevation, partially broken away, showing the containment device in a dry weather condition.
Figure 3B:
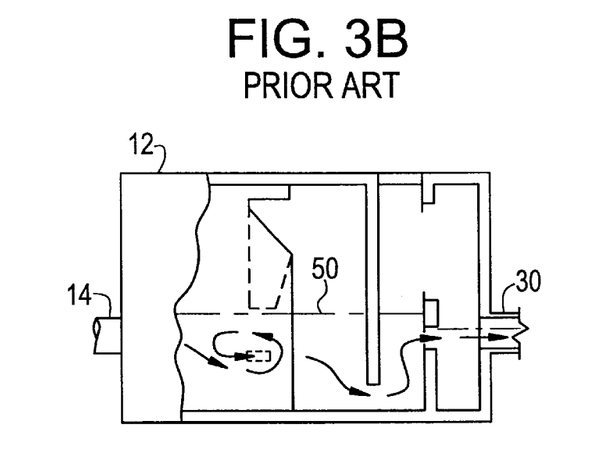
FIG. 3B is a view similar to FIG. 3A showing the device during the initial phase of operation.
Figure 3C:
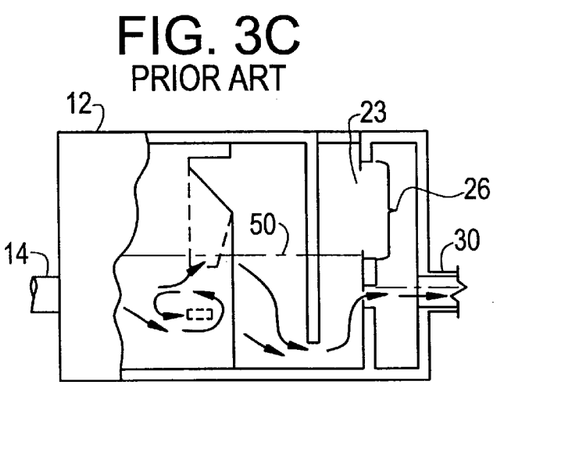
FIG. 3C is a view similar to FIG. 3A showing the device during the transitional phase of operation.
Figure 3D:
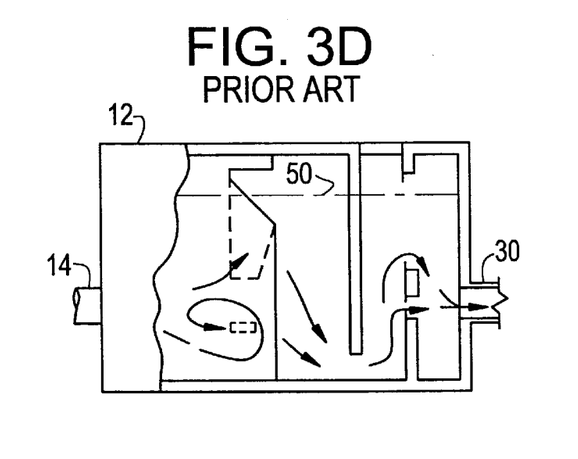
FIG. 3D is a view similar to FIG. 3A showing the device during full capacity phase of operation.

In use, water drainage possibly mixed with sewage, enters the tank 12 through the inlet 14, resulting in a swirling motion being imparted thereto. Initial drainage at very low levels begins through opening 29. As flow levels increase the water level rises behind the bulkhead 16 until it is higher than the crest of opening 28 at which point the water level rises in the rest of the tank 12. Oil and other floating particulate, which are mixed in the water rise along with the overall water level. The overall water level rises as the water flows through the openings 28 and 29 and exits through the low-level outlet 24 at the rate controlled by the orifice plate 22. The orifice plate 22 is slightly higher than the opening 29 thereby allowing skimming of the non-floating particulate into the containment chamber during cleaning. The overall water level rises because the inlet flow rate exceeds the outlet flow rate. This is referred to as the initial phase, as shown in FIG. 3B. During the next phase, referred to as the transition phase, as shown in FIG. 3C, the vertical separation distance between the floating particulate and the bottom of the baffle 18 increases. The water level rises to the level of the high level outlet 26, as shown in FIG. 3D. The rate of flow of the exiting water is increasing slightly as the water level is increasing but is still controlled by the orifice plate 22. This continues until the water level rises above the opening in the weir plate 23 at the high level outlet 26. At this point the flow rate through the tank 12 begins to increase significantly.

Figure 3E:
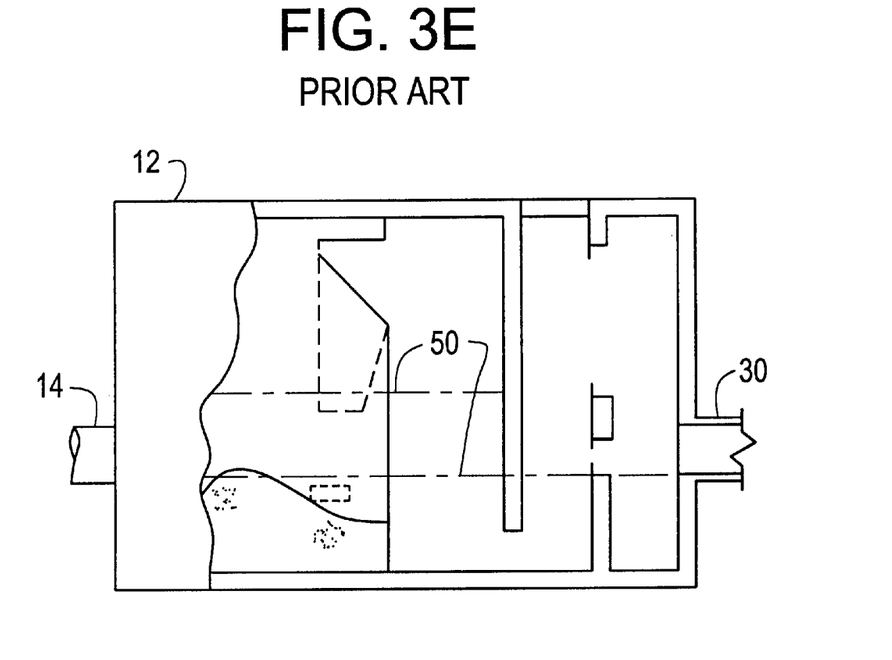
FIG. 3E is a view similar to FIG. 3A showing the device during the final phase of operation when water ceases to enter the apparatus.
Figure 3F:
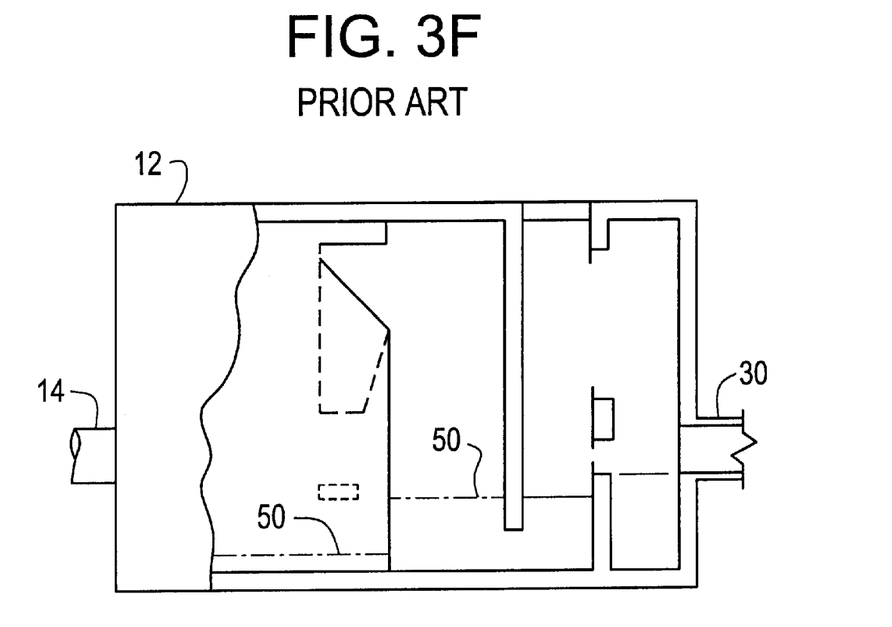
FIG. 3F is a view similar to FIG. 3A showing the present invention after the collected non-floating particulate has been removed and drainage has ceased.

During the next phase, referred to as the full capacity phase, as shown in FIG. 3D, the high outlet 26 is controlled by plate 23 which is designed to transfer as much water as the outlet pipe 30 can discharge. This continues until the rate at which the water is introduced through the inlet 14 decreases to the point where the water level drops below the level of the high-level outlet 26. The remaining water in the tank 12 is discharged at a rate determined by the orifice plate 22. Eventually the water level drops to the invert elevation of the orifice plate 22 which covers the low level outlet 24 as shown in FIG. 3E. Now the point has been reached where there is no flow through the tank 12. The overall low water level as shown in FIG. 3E permits an easy inspection. The level of particulate accumulation can be determined for example by removing covers 20 to see if there is enough accumulated floating and non-floating particulate to necessitate the cleaning to the tank 12.

For purposes of the present specification apparatus of the foregoing type which are used to separate floating and non-floating particulates from drainage water, shall be referred to as "drainage separating tanks". While drainage separating tanks of the type illustrated are indeed useful for separating sediment and other solid and semisolid materials from drainage water, they are of limited value in removing insoluble oils and the like, and are of essentially no value in removing slightly soluble organics of the pernicious types which have been discussed above.

SUMMARY OF INVENTION

Now in accordance with the present invention, it has been found that by incorporating certain fluid-previous filtration materials into or at drainage water accessible portions of drainage separating tanks, both oily water insoluble contaminants (e.g. oil spills, asphalt spills and the like), as well as slightly soluble organics such as benzene, toluene, xylene, halogenated hydrocarbons, ethoxylated glycols, etc., may be readily removed from the drainage water, leaving a safe water product for discharge from the separating tank. The filtration materials used incorporate the compositions disclosed in the present inventor's U.S. Pat. Nos. 5,437,793; 5,698,139; and 5,837,146, and in said inventor's copending patent application Ser. No. 08/856,263 (all of which disclosures are hereby incorporated by reference). These compositions have extremely strong affinities for all of the aforementioned contaminants in water, and when aqueous streams or volumes containing these noxious contaminants are passed through or otherwise contacted with filtration media incorporating these inventive compositions, the contaminants are immobilized at the media, as a result of which concentration levels of the contaminants in the remaining water may be reduced to very low values, in some instances below detectable limits.

Filter configurations incorporating the said compositions (hereinafter referred to as "absorbent compositions") may be based on various water permeable substrates, such as shredded, spun or otherwise configured polypropylene or shredded or spun cellulose, which substrates are infused or otherwise treated with the absorbent compositions, which are then cured. These substrates may then be packed or otherwise disposed in selected portions of the containment vessel; or can be formed into cured and infused bag filters which can be emplaced in the vessel. Similarly the said absorbent compositions can be incorporated into or upon other filtering substrates and media, such as paper, including compressed pulp materials, particulate porous foamed plastics, mineral particulates such as perlite and vermiculite, and particulate, fibrous or porous ceramic or porous (e.g. sintered) metal substrates and media.

It should be appreciated that the use herein of the term "absorbent composition" is one of convenience for identifying the compositions of my aforementioned patents and patent applications. The mechanism by which the absorbent compositions remove oils asphalts and the like appears to be one akin to coagulation as is discussed in the aforementioned patents. The specific mechanism by which the noxious slightly soluble contaminants are removed from aqueous streams by conjunctive use of the "absorbent compositions" is not completely understood, and could include attachment and/or fixation of such contaminants by mechanisms which technically involve various physical and/or chemical interactions. The term "absorbent" as used herein is intended to encompass all of these possible mechanisms.

BRIEF DESCRIPTION OF DRAWINGS

The drawings appended hereto represent (as already discussed) a prior art drainage containment system, in which.

DESCRIPTION OF PREFERRED EMBODIMENTS

The filtration media of the present invention can typically be emplaced in the chamber 31 of FIG. 1, and/or in the chamber or space 33; and/or in the chamber or space 34. The filtration media can be present in any of the forms discussed above, one presently preferred form being that of a particulate perlite which has been infused with the absorbent composition. Similarly the filtration media can be a shredded cellulose, such as the Absorbent GP material available from Absorbent Corporation of Bellingham, Wash. The shredded material in this instance is treated with an absorbent composition in a manner which will be set forth below. The filtration media can be present in only a portion of the mentioned chambers or can substantially fill most of the chamber(s). It can also be present as sheets or layers which are secured to the interior walls of part or all of the chamber or chambers. For example layers or sheets carrying the absorbent composition can be applied to all interior walls of chamber 31 so as to leave only the intake and outflow openings uncovered by the filtration media. with an infused substrate which defines the filtration media 12. Thus the fluid-previous media may be provided in or abounding the flow path of the drain water as the flow proceeds between the inlet and outlet of the apparatus.

The absorbent composition disclosed in the first of my aforementioned patents, i.e. U.S. Pat. No. 5,437,793, is characterized therein as a coagulant product which comprises a glyceride such as linseed oil reacted with a polymer such as poly (isobutyl methacrylate) which is then diluted with a solvent, such as 2,2,4-trimethyl-1,3-pentanediol monoisobutyrate. The composition formed by the thermal reaction of the linseed oil with the isobutyl methacrylate polymer is a soft resinous product which, when diluted with a solvent, results in a mixture that in the teaching of the said patent can be sprayed onto an oil spill or otherwise introduced to the oil spill to coagulate the oil. Additionally, however, and as disclosed in my further U.S. Pat. No. 5,698,139 patent and copending applications above cited, further experimentation has led to the discovery of additional absorbent compositions produced from polymers and a variety of natural animal and vegetable oils, fatty acids, alkenes and alkynes, which absorbent compositions are all utilizable in the filters and filtration processes of the present invention. More generally these latter compositions are the thermal reaction product of a polymer component with an oil component selected from the group consisting of glycerides, fatty acids, alkenes and alkynes. The reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid or alkene or alkyne containing from about 8–24 carbon atoms. The combination of a methacrylate polymer component with any of these oil components can provide either a first or second endpoint product, depending upon the reaction conditions. The term "first endpoint product" is used to describe the solubility product of the reaction which is a cooperative structure held together by many reinforcing, noncovalent interactions, including Van Der Waals attractive forces. The term "second endpoint product" is used to describe the product of the reaction which is the result of covalent bond formation between the polymer component and the oil component, as indicated by the change in molecular weight.

The absorbent composition is readily synthesized from a polymer component and an oil component selected from the group consisting of glycerides, fatty acids, alkenes and alkynes. In a preferred embodiment, the product is synthesized from an isobutyl methacrylate polymer, and the oil component is one derived from a natural oil, such as linseed oil or sunflower oil. Optionally, the composition is then diluted with a solvent, such as 2,2,4-trimethyl-1,3-pentanediol monoisobutyrate or acetone. The diluted composition can then be applied to a desired substrate for use as a filtration media pursuant to the present invention.

The polymer component of the absorbent composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043. However, it is anticipated that other equivalent polymers can be used to prepare equivalent compositions of the invention. Combinations of polymers can be used to advantage in the preparation of the absorbent compositions.

The test used to determine whether or not a polymer can be used in preparing the absorbent compositions of the present invention is to combine the polymer component in question with the oil component, as set forth herein, to see if the resultant combination forms a homogenous product after heating. Ideally, the polymer component percentage of the composition should range from about 15–75%, preferably 20–40%, or more preferably from about 25–35%, by weight.

In one embodiment of the absorbent composition, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component of the invention. Animal oils, such as, for example, fish oil, tallow and lard can also be used as a glyceride component of the composition. It is anticipated that any drying oil or semi-drying oil will work in the composition. Generally, a drying oil is defined as a spreadable liquid that will react with oxygen to form a comparatively dry film. Optionally, combinations of two or more glycerides can be used as reactants with the polymer to provide absorbent compositions useful in the present invention.

In a preferred embodiment, the oil component of the absorbent composition is a glyceride derived from a drying oil, such as linseed oil, that can be obtained from Cargill, Inc. as Supreme Linseed Oil, or sunflower oil. The glyceride should comprise from about 25–85%, preferably about 60–80%, and most preferably, from about 65–75% of the coagulant composition. All percentages in this disclosure are by weight, unless otherwise stated.

Where the oil component of the composition is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10–20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The absorbent composition is a product with characteristics different from either of the starting materials or a simple mixture of the two starting materials, thus showing that a new composition is produced by the thermal reaction. Specifically, the oil/polymer absorbent compositions pass a clear pill test after being heated at the elevated temperatures and do not separate into two parts upon being cooled but, rather form a homogenous, uniphase compound.

More specifically, the solvent can be selected from aliphatic hydrocarbons, aromatic hydrocarbons, alcohols, ketones, ethers, aldehydes, phenols, carboxylic acids, synthetic chemicals and naturally occurring substances.

The absorbent composition used in the present invention is prepared by a thermal reaction process. The first step of the process involves heating the oil component (glyceride or fatty acid or alkene or alkyne) to approximately 235–350° F. at a rate of about 5° F. per minute with continuous stirring. Then, the polymer component, usually in powdered form, is slowly stirred into the heated oil component. Depending upon the particular reactants used, the oil component should range from about 25–85%, preferably about 65–80%, more preferably about 72–77%, and the polymer should range from about 1–50%, preferably about 20–40%, more preferably about 23–28%, of the coagulant composition. After this mixture has been mixed properly, the mixture should be heated to approximately 400–700° F., depending on the particular components utilized for the reaction, and the desired endpoint of the reaction. Typically, reaction temperatures below about 500° F. produce "first endpoint products" while temperatures above about 500° F. produce "second endpoint products"

The mixture should be heated at that temperature until a clear pill test indicates that the reaction has reached its first end point, i.e., a drop of the reaction mixture when placed on a clear glass plate is clear. When a clear pill test indicates that the reaction has reached its first end-point, the mixture should be cooled to a temperature below 200° F., generally about 180° F. After cooling, the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F.–500° F. This is designated the "first endpoint product" (solubility product).

In the second reaction, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Absorbent compositions have been prepared by this reaction which range from soft to hard, and elastomeric to brittle in nature depending upon the ratio of the oil component to the polymer component and the choice of the polymer component and/or the oil component used. If the reaction mixture separates into two phases upon cooling it is not useful for the invention. In this manner, any polymer can be identified for use in the invention.

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the absorbent compositions was conducted. The results indicate that a reaction is occurring between the oil component and the polymer.

Differential scanning calorimetry (DSC) was thus performed on several such compositions. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Samples were taken at the beginning of the reaction procedure described earlier and at the end of the reaction. The DSC profile for the initial starting materials is dramatically different from the profile of the product. The initial profile showed two exothermic events when the DSC analysis is carried out from 40–280° C., one event occurring at about 100° C. and the other at about 217° C. In the DSC profile of the reaction product, however, there was only one exothermic event, occurring at about 261° C. The samples were taken at initial and final points during the reaction and allowed to cool to room temperature before being subjected to the DSC.

In the instance of a further reaction, DSC's of the starting materials and final product were obtained. Again, the DSC curves generated show that two thermal events occurred for the "just mixed" reactants while only one thermal event occurred for the final product. Thus, the DSCs indicated that the occurrence of a reaction or phase transformation. Similar evidence obtained from IR spectra analysis also confirms that the absorbent compositions used in the invention are distinct products from the reactants used to prepare the absorbent compositions.

EXAMPLE 1

In order to prepare a filter substrate for use in the invention, an infusion solution is prepared from a suitable solvent and the absorbent composition. In this example a solution was prepared from 90 w/w 99.9% acetone and 10 w/w absorbent composition which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example was a nonwoven polypropylene, viz. the VERASPUN material of Yarorough & Co., Inc. of High Point N.C. This material has a weight of 1 oz./square ft. The substrate material was immersed in the infusion solution until saturated, then removed and excess liquid allowed to drip off. The material was then placed in a convection oven at 110 to 120 deg F. until acetone free. The material was then cured at room temperature for one week. The resulting material was then shredded and subsequently used in filter configurations.

EXAMPLE 2

Filter Test Results

Effectiveness of the treated filter material of Example 1 is illustrated as a selective oil and organic chemical filter. The identity of these samples and the procedure are as follows:

| | |
|---|---|
| 1d - 5,000 ppm | Gasoline |
| 2d - 5,000 ppm | Emulsified Diesel Fuel |
| 3d - 20,000 ppm | Emulsified Light Crude Oil |
| 4d - 50,000 ppm | (50/50) Toluene/Xylene |

Procedure: 750 g. of deionized water (20 megaohm) spiked with quantity sufficient dopant to achieve desired initial concentrations was passed through a tube of shredded polypropylene(VERASPUN) material 1 (weight=40 g) at a rate of about 0.5 L/minute with approximate contact time of 1.5 sec. The entire 750 ml was processed through the filter material and collected. A 50 ml sample of each effluent was drawn and analyzed using the standard EPA method for total organic carbon.

Conditions: contact time=1.5 sec. Filter wt=40 gm Effluent wt=750 gm

| Results | Initial Concentration | Final Concentration |
|---|---|---|
| Gasoline | 5,000 ppm | 93.9 ppm |
| Emulsified Diesel | 5,000 ppm | 60.2 ppm |
| Emulsified Light Crude Oil | 20,000 ppm | 74.3 ppm |
| Toluene/Xylene | 50,000 ppm | 91.7 ppm |

As can be seen, even with a massive amount of contamination, the purification factor ranges from 50× to 500× even though the dwell time was short and the weight of water processed exceeded the filter weight by 20×. There was noticeable channeling during this test. The final concentration would have been even lower after one pass without the channeling.

EXAMPLE 3

Seven further samples of contaminated water were subjected to the following test. Using the procedure of Example 1, an AMETEK 5 micron polypropylene sediment filter Model P5 (Ametek, Inc., Sheboygan, Wis. 53082) was infused with the absorbent composition and allowed to cure. This filter was subsequently placed in a polypropylene filter cartridge assembled and attached to a centripetal pump with a flow rate of 3 gal/min. One liter solutions of the following contaminated water samples were prepared.

1) 2% Light Crude Oil/$H_2O$
2) 0.5% W/W Gasoline/$H_2O$
3) 2% Light Crude Oil/$H_2O$
4) 100 ppm III Trichloroethane/$H_2O$
5) 0.7% Light Crude Oil/$H_2O$
6) 100 ppm III Trichloroethane/$H_2O$
7) 100 ppm Naptha/$H_2O$ Each entire sample was placed in a 3 liter beaker and allowed to circulate through the pump for one minute. At that time, a 100 ml sample was taken from the outflow hose on the pump. The samples after being passed through the filter were subjected to total organic carbon (TOC) analysis, using the procedure of U.S. EPA "Methods for Chemical Analysis of Water and Wastes, 1979, Revised 1983." Method 415.1.

Results were as follows:

TABLE 1

| Initial Sample | Resulting TOC (mg/L) |
|---|---|
| 1) 2% Light Crude Oil/$H_2O$ | 14.3 |
| 2) 0.5% W/W Gasoline/$H_2O$ | 34.4 |
| 3) 2% Light Crude Oil/$H_2O$ | 38.5 |
| 4) 100 ppm III Trichloroethane/$H_2O$ | 18.2 |
| 5) 0.7% Light Crude Oil/$H_2O$ | 10.9 |
| 6) 100 ppm III Trichloroethane/$H_2O$ | 5.9 |
| 7) 100 ppm Naptha/$H_2O$ | 15.8 | mg/L = Parts Per Million (ppm)

EXAMPLE 4

A 250 ml solution was prepared of 300 parts per billion (PPB) Arochlor 1254 in hexane. This test solution was poured through a funnel containing approximately 3 g of strips of filter material prepared as in Example 1. The absorbent composition of Example 1 constituted 5% by weight of the woven polypropylene material infused with the absorbent. Dwell time of the solution in the funnel was about 1 to 2 seconds. The filtrate having passed through the filter material was analyzed by gas chromatography, from which it was determined that 42% of the PCB 1254 was removed in the single pass.

EXAMPLE 5

A series of tests was run on aqueous input samples to which small concentrations of methyl tertiary butyl ether (MTBE) had been added. Following filtration under various conditions and with several differing substrates, the filtered samples were tested using a GCI-8160 gas chromatograph apparatus of SRI Instruments. A PID detector was used with helium as the carrier gas. The results are shown in Table 2 below. In tests 1 through 7 the filtration media consisted of 12 Ametex 10" spunbound polypropylene filters fit into one Serfilco cartridge unit. The filtering media was infused with 2% by weight of the absorbent composition of the invention, by the procedure described in Example 1. The filtration process was conducted by using a recirculating pumping arrangement for a recirculation period as specified in Table 2. In tests 8 and 9 of Table 2, the filtration media consisted of a non-woven polypropylene filter having average pore size of 5 microns. In test 8 the filter material had been infused with 2% by weight of the thermal reaction product of 10% isobutyl methacrylate and 90% ESSKOL, the latter being a bodied linseed oil product produced by Reichold Chemical. In test 9 the Esskol was replaced by CYKELIN, which is similarly a bodied linseed oil product of Reichold Chemical. The infusion procedure was similar to that described in Example 1 except for the differences in the absorbent composition which have been described. In the testing procedure a gravity pass was used in tests 8 and 9. Specifically a 4" square of the filter material (4 layers of the nonwoven polypropylene) was placed in a funnel. 40 ml of the contaminated water sample was poured on the material so that it could not flow around it. The effluent from the funnel was collected in a clean sample bottle for analysis. The retention time in the filter was 1 to 2 seconds. It will be evident from the tabularized data of Table 2 that by use of the filtration methods and devices of the invention, vast diminutions of the MTBE concentrations have resulted.

TABLE 2

| Start With | Filtration Materials | Comments | Results |
|---|---|---|---|
| 1) 333 ppb | Infused Spunbound Polypropylene | 4 min circulation | 140 ppb |
| 2) 333 ppb | Infused Spunbound Polypropylene | 5 min circulation | 74 ppb |
| 3) 333 ppb | Infused Spunbound Polypropylene | 10 min circulation | 60 ppb |
| 4) 333 ppb | Infused Spunbound Polypropylene | 15 min circulation | 52 ppb |
| 5) 333 ppb | Infused Spunbound Polypropylene | 45 min circulation | 25 ppb |
| 6) 3.33 ppm | Infused Spunbound Polypropylene | 1 min circulation | 650 ppb |
| 7) 3.33 ppm | Infused Spunbound Polypropylene | 5 min circulation | 420 ppb |
| 8) 2 ppm | Infused Nonwoven Polypropylene | gravity | 117 ppb |
| 9) 2 ppm | Infused Nonwoven Polypropylene | gravity | 189 ppb |

EXAMPLE 6

A circulating pump was used to pump 3 liters of water through a filter housing that held one 10" polypropylene spunbound 5 micron filter. The filter element had been infused with about 17% by weight of the absorbent composition of the invention by the procedure described in Example 1. The pump unit recirculated the water at 10 gpm. A small addition of benzene was made to the 3 liter volume and samples were pulled from the effluent line from the filter unit after 5 minutes to allow the benzene to completely flow through the unit. Cumulative additions were made for 1 to 1400 ppm of combined benzene to generate the loading graph of FIG. 5. All samples were analyzed on the SRI gas chromatograph using a purge and trap system and a photo ionization detector. The measured ppb of the filtrate for the samples is shown in the graph as a function of the ppm benzene concentration present in the input samples. The removal of benzene is seen to be very effective across the entire range of input concentrations.

EXAMPLE 7

The procedure of Example 6 was repeated, except that the contaminant for the sample was ethylbenzene. The results are shown in FIG. 6, which illustrates a very high efficacy of the present filtration at all ranges of input concentrations tested.

EXAMPLE 8

The procedure of Example 6 was repeated, except that the contaminant for the sample was toluene. The results are shown in FIG. 7, which again illustrates the high efficacy of the present filtration across the range of input concentrations tested.

EXAMPLE 9

An industrial wastewater sample containing a large variety of contaminants was subjected to filtration using devices and methods in accordance with the present invention. The Serfilco cartridge unit utilized in the test holds 12 Amtek 10" spunbound polypropylene filters (Ametek, Inc., Sheboygan, Wis. 53082) in a parallel arrangement. Each filter element had been infused with about 17% by weight of the absorbent composition of the invention, by the procedure described in Example 1. A sample was processed in a single pass through the filter assembly. Flow rate through the filter was approximately 30 gpm, with dwell time in the filter assembly being 1 to 2 seconds. The contaminant concentrations for the input and output sample was measured and are shown in Table 3 below. It will be evident that outstanding removal of the organic contaminants has been achieved.

TABLE 3

| Input Wastewater | Purified Filtrate (mg/l) |
|---|---|
| Biochemical Oxygen Demand (5 Day) (405.1), mg/l | 230 |
| Suspended Solids (160.2), mg/l | 120 |
| Oil & Grease (1664), mg/l | 14 |
| Phenol (50) mg/l | 0.078 |

EXAMPLE 10

Oil and grease (O&G) adsorption onto an absorbent infused perlite was evaluated using 1 inch gravity driven columns. Preliminary testing shows an 84% reduction in oil and grease with an influent concentration of 83 mg O&G/L. In the procedure used, a particulate perlite was infused with the absorbent composition of the invention using the procedure of Example 1. This resulted in a perlite media containing 5 to 10% by weight of the absorbent composition.

A test column was prepared from 1 inch PVC pipe that housed a swatch of porous fabric for media support. The column was packed with 21 grams of the treated perlite media to produce a 9.5 inch depth. Two liters of O&G containing water was prepared by adding small droplets of used 30 weight oil to the entire volume. The solution was mixed thoroughly with small doses being poured through the column immediately after each mixing/shaking. (This shaking and dosing technique was also used to collect a representative influent sample.) Two liters were collected from the testing influent and effluent, and preserved with HCl in amber glass bottles. EPA method 1664 was used for analysis.

The samples were analyzed to produce an influent concentration of 83 mg O&G/L and an effluent concentration of 13 mg O&G/L. This is an 84% reduction in O&G. A control non-treated perlite column test produced a 41% reduction of O&G with an influent of 37 mg O&G/L.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be broadly construed, and limited only by the scope and spirit of the claims appended hereto.

I claim:

1. In an apparatus for separating floating and non-floating particulate from drain water, of the type having:
   (a) a tank for separating particulate;
   (b) an inlet for introducing water drainage;
   (c) a bulkhead substantially cylindrical containment wall for containing non-floating particulate under relatively higher drain water flow rates and under relatively low drain water flow rates, wherein a design of said containment wall induces a swirling of said drain water within said tank;
   (d) a baffle for containing floating particulate under said relatively higher drain water flow rates and under said relatively lower drain water flow rates;

(e) an outlet;

(f) an orifice plate for controlling drain water level within said tank as a function of the rate of discharge of said drain water under said relatively lower drain water flow rates; and (g) a weir plate for controlling said drain water level as a function of the rate of discharge of said drain water under said relatively higher drain water flow rates such that said drain water level within said tank is greater than a level of said inlet;

THE IMPROVEMENT enabling removal of oily and of slightly soluble organic contaminants also contained in said drain water, comprising:

a fluid-previous media being provided at the interior of said apparatus in or abounding the flow path of the drain water proceeding between said inlet and outlet, said media being infused with a composition comprising a homogeneous thermal reaction product of an oil component selected from the group consisting of glycerides, fatty acids, alkenes, and alkynes, with a methacrylate or acrylate polymer component; the said contaminants in the drain water flowing through said apparatus thereby coming into intimate contact with and being immobilized at said media.

2. Apparatus in accordance with claim 1, wherein the said media comprises a nonwoven polyproplyne.

3. Apparatus in accordance with claim 1, wherein the said media comprises paper.

4. Apparatus in accordance with claim 1, wherein the said media comprises a porous ceramic.

5. Apparatus in accordance with claim 1, wherein the said media comprises a metal.

6. Apparatus in accordance with claim 1, wherein the said media comprises a mineral particulate.

7. Apparatus in accordance with claim 6, wherein the said mineral is vermiculite.

8. Apparatus in accordance with claim 6, wherein the said mineral is perlite.

9. Apparatus in accordance with claim 1, wherein the fluid-previous media is present at the interior of a chamber defined in said apparatus between said inlet at outlet, through which said drain water flows.

10. Apparatus in accordance with claim 1, wherein the fluid-previous media is affixed to an interior surface of said apparatus which abounds the flow of said drainage water between said inlet and outlet.

* * * * *